Dec. 20, 1932.    R. P. BROWN    1,891,617
CONTROL METHOD AND APPARATUS
Filed Dec. 1, 1927    2 Sheets-Sheet 2
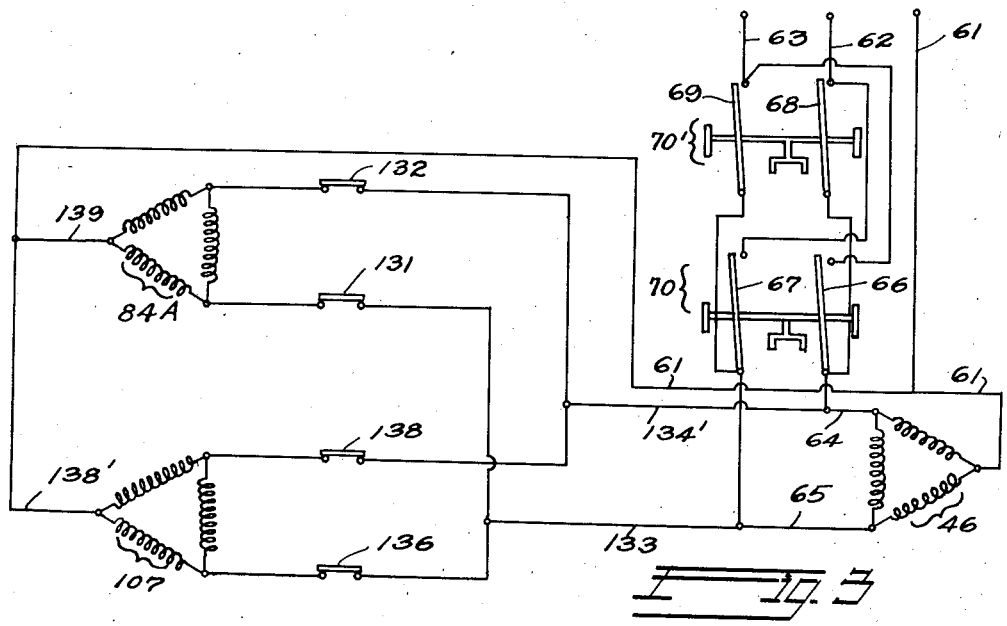
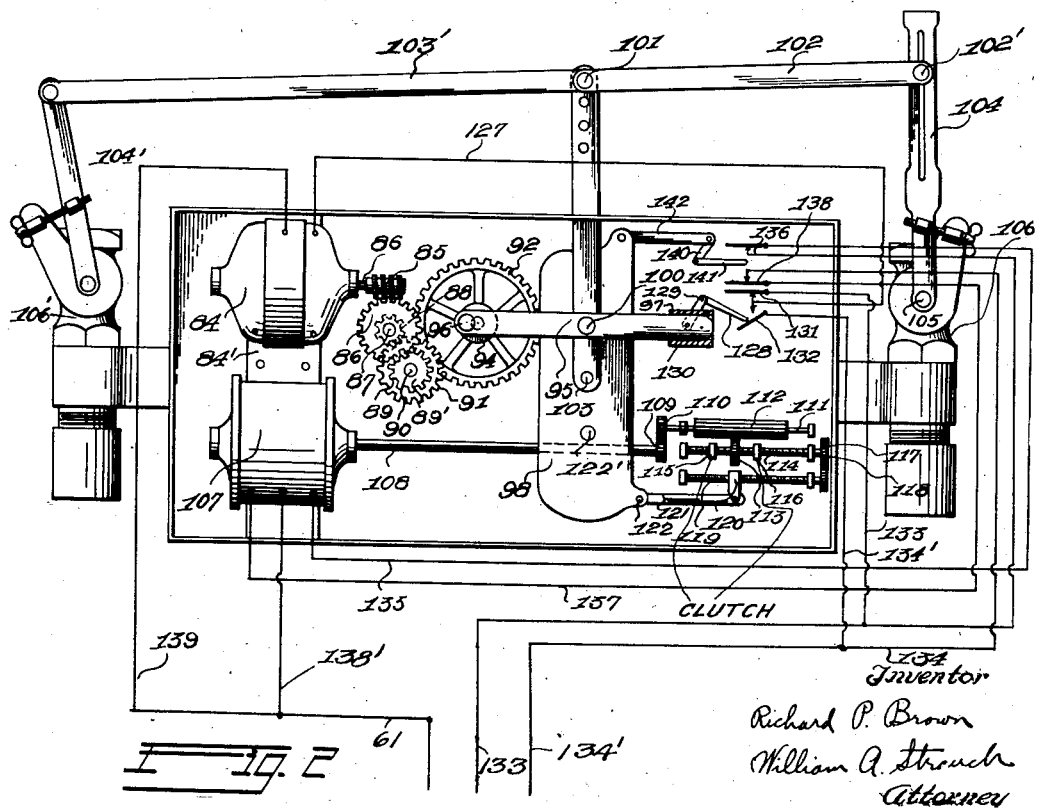
Inventor
Richard P. Brown
William A. Strauch
Attorney Patented Dec. 20, 1932

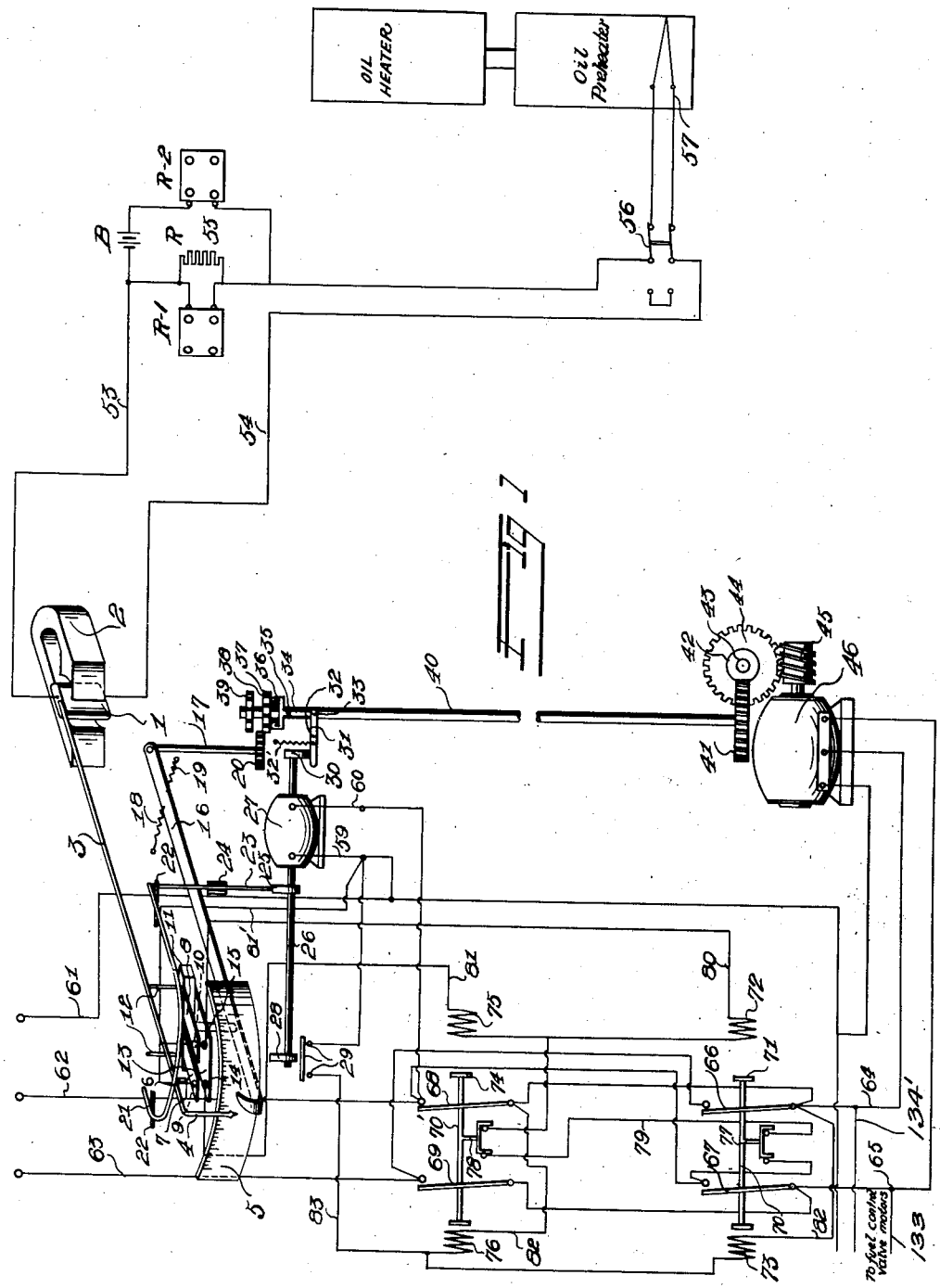

1,891,617

REISSUED

UNITED STATES PATENT OFFICE

RICHARD P. BROWN, OF PHILADELPHIA, PENNSYLVANIA, ASSIGNOR TO THE BROWN INSTRUMENT COMPANY, OF PHILADELPHIA, PENNSYLVANIA

CONTROL METHOD AND APPARATUS

Application filed December 1, 1927. Serial No. 237,103.

My invention relates to control methods and apparatus and more particularly, to control methods and apparatus for controlling various physical conditions such, for example, as the regulation of temperature in furnaces, oil still pre-heaters, towers, gas making machines, chemical retorts, kilns, ovens and the like.

In the practical operation of furnaces and similar devices, mechanisms operated in accordance with temperature variations in the furnace from a predetermined temperature as measured by a pyrometer, control the rate of heat supply in accordance with such temperature variations to restore the temperature to the predetermined value. Inasmuch as there is usually a lag between the rise or fall in temperature and the change in fuel supply for restoring the temperature to the predetermined value, due to heat capacity and resistance to heat flow of the various parts, the controller will act to change the rate of heat supply even after the rate of heat supply is such as to return the furnace to and maintain it at the predetermined temperature, and as a result the temperature of the furnace will move beyond the predetermined value. The controller then operates in the reverse direction and the above described operation is repeated carrying the furnace alternately to too high and too low a temperature and causing what is known as "hunting".

With the usual forms of controllers, hunting occurs in particularly undesirable manner in furnaces of the tubular oil type still, or in other cases where a furnace in practice is called upon to operate under extreme conditions caused by sudden variations in weather conditions, due to storms, or by sudden variations of the quality or quantity nature of fuel supply or furnace charge.

With the usual controllers, the fuel supply or heat energy control mechanisms are adjusted to operate between fixed limits which are determined by the average condition of the furnace in order to prevent sudden large changes in the rate of fuel supply. If, however, the fuel supply valves are opened or closed in accordance with large temperature variations accompanying the extreme conditions of an empty or full furnace, or those above mentioned, the sudden change in heat energy supply will ordinarily be far in excess of the requirement and will result in hunting.

The fuel supply valves in order to operate satisfactorily for normal changes are so adjusted that when they are closed to their minimum position the supply of fuel is small enough so that the temperature does not exceed a predetermined value with an average condition in the furnace. When, however, the furnace has a comparatively small or no charge, or a sudden marked rise in temperature of atmosphere occurs this minimum opening of the valve is still too large and the temperature will tend to rise to an excessive value. On the other hand, the maximum opening of the valves is adjusted to such a position that with an average condition of the furnace, sufficient fuel will be supplied to bring the furnace to its predetermined value. If an excessive charge is suddenly added to the furnace, or a sudden drop in atmospheric temperature occurs, thereby suddenly changing the condition of the furnace, this maximum opening of the valve will not be sufficient to keep the temperature at the predetermined values.

From extended experiment, I have discovered that a furnace subject to sudden extreme conditions can be controlled automatically to a predetermined temperature in a manner to minimize the unnecessarily large changes in the fuel supply that produce hunting, by operating the fuel supply valves between fixed limits and shifting the limits in accordance with varying conditions of the furnace from an average condition.

A primary object of my invention accordingly is to provide methods and means for controlling furnaces operating under extreme conditions to predetermined temperatures substantially without undesirable hunting.

Another object of my invention is to provide control means and methods for controlling conditions between limits and varying the limits in accordance with variations of the condition or conditions from a predetermined value or values.

Still another object of my invention is to provide control means automatically brought into operation in the event of an abnormal change of condition for bringing the controlled condition back to a normal value with substantially no undesirable hunting.

In order to provide a stabilizing action on the system under control, the controller operates to make a sudden change in the heat supply or like condition in response to sudden changes of trend of the measured quantity. Accordingly, a further object of my invention is to provide means for closing a fuel control valve or other heat energy control mechanism rapidly and opening it slowly. In furnaces of comparatively large heat capacity, however, a substantial time lag exists between the change of heat energy supply and the resultant temperature changes. As the controller responds to actual temperature conditions, it is evident that the usual types of periodic control apparatus cannot return to the normal or predetermined position immediately after the change of heat energy supply, even though a sufficient correction to the supply is made to ultimately bring the temperature to the desired value. In applying my invention to this type of furnace, a time interval control is provided for so adjusting the apparatus that the operation of the limit shifting mechanism may be delayed for an interval to prevent operation thereof if sufficient correction of the heat supply energy has been made to cause restoration to normal without changing the limits of operation of the correcting mechanism.

Accordingly other objects of my invention are to provide means for producing a lag in the variation of heat energy supply in accordance with changes from a predetermined value, to provide means for rendering a controller inoperative for intervals of time; to provide means for varying the adjustment of heat energy supply only after a predetermined interval after the limits of the measured value have been reached; to provide means in operating periodic control apparatus whereby several cycles of operation thereof are required before the control apparatus functions; and to provide means whereby a temperature is permitted to respond fully to an initial operation of a control apparatus before the control apparatus again becomes effective.

Still further objects of my invention will appear in the specification which follows and are defined by the scope of the appended claims. Referring to the drawings:

Figure 1 is a diagram of the control apparatus employed in carrying out my invention.

Figure 2 is a plan view of a fuel valve controlling mechanism operated between variable limits under control of the control apparatus.

Figure 3 is a circuit diagram of a modification of my invention.

Referring now more particularly to Figure 1:

A contacting control galvanometer is provided comprising a movable coil 1 suspended between the poles of a permanent magnet 2. Secured to the coil 1 is a pointer 3 which is preferably provided with a downwardly extending portion 4 adapted to swing in front of a graduated scale 5 to indicate the deviation of the pointer from normal in the operation of the instrument. The pointer 3 is provided with a contact actuating extension 6 which is adapted to coact with carrying springs 7 and 8.

Secured to the springs 7 and 8 are the electrical contacts 9 and 10. A block of insulating material 11 is provided to which are secured the springs 7 and 8 and pointer limiting stops 12. Block 11 supports movable contact table 13 and secured to the movable contact table 13 are the contacts 14 and 15 which are adapted to be engaged by the contacts 9 and 10 in the operation of the device as will appear more fully hereinafter. Table 13 is rigidly supported from and movable with a supporting arm 16 which may be provided with an upwardly extending pointed extension coacting with the scale 5.

Arm 16 is secured to and rotatable with vertical shaft 17. Springs 18 and 19 normally maintain arm 16 together with the contact table 13 in a central position. Shaft 17 is driven by a gear 20 as will more fully hereinafter appear. Pointer 3 is periodically lowered and raised under the control of depressor bar 21 which is pivotally supported above the pointer at the points 22 in any suitable manner and is actuated by a vertically slidable rod 23 suitably guided at 24. Rod 23 is actuated in its vertical movement by means of cam 25 against which the lower end of rod 23 is held due to the weight of the parts or by a light spring (not shown).

Cam 25 is mounted on a shaft 26 which is driven by the motor 27. Mounted on the shaft 26 is the cam 28 which actuates a switch member 29. An escapement actuating cam 30 also mounted on shaft 26 actuates an arm 31 pivotally supported at 32 with one end thereof preferably held in engagement with the cam 30 by means of a spring 32'. The opposite end of arm 31 is pivotally connected at 33 to a vertically extending link 34 which in turn is pivotally connected at 35 to a collar member 36. Secured to and rotatable in the collar member 36 is an escapement gear member 37 upon which are secured the gears 38 and 39 adapted to mesh with the gear 20 and to drive the contact table.

Gear 20 and escapement gears 38 and 39 are separated as shown and are mutilated by removing alternate teeth in each gear so that as the cam 30 oscillates or shifts gears 38 and 39 alternately into engagement with the gear 20 the springs 18 and 19 will cause the contact table to be stepped backwards by an amount equal to the distance of one tooth for each reciprocation of member 37. This is effected by removing the alternate teeth in such a manner from the gears 38 and 39 that the teeth on the gear 39 will be in line with the points where the teeth have been removed from the gear 38.

Member 37 is keyed to and slidably mounted upon the shaft 40 so that as the shaft 40 is rotated, the gears will be driven to shift the contact table and as member 37 slides vertically due to the action of the cam 30, the contact table will be permitted to step backward to zero position one step for each oscillatory movement of the member 37 along shaft 40. Shaft 40 is driven by worm gear 41 which in turn is driven by a worm 42 suitably mounted on a shaft 43. Shaft 43 is driven by a worm wheel or spiral gear 44 which in turn is driven by a worm or spiral gear 45 driven by motor 46.

Galvanometer coil 1 is connected by means of conductors 53 and 54 through a potentiometer 55 embodying a battery B, fixed resistance R and the adjustable resistances R–1 and R–2 to the double pole double throw switch 56 which in one position is adapted to connect the pyrometer or thermocouple 57 in series with the conductors 53 and 54. Thermocouple 57 is located at a point where a temperature is to be controlled as for example in the outlet of an oil preheater as shown for example in the patent to Poole 1,615,478 January 25, 1927, in the tower of a tubular oil still, or in a heating furnace to be controlled.

The motor 27 is connected by means of conductors 59 and 60 and the supply leads 61 and 62 to a source of electrical power. Supply lead 61 of the power source is permanently connected to one lead of motor 46 and the remaining two leads of the motor 46 are adapted to be connected to either one of the remaining power supply leads 62 and 63 by means of the conductors 64 and 65, switch blades 66, 67, 68 and 69 of the motor reversing switches 70 and 70′. Blades 66 and 67 are secured to and actuated by a member 71 which in turn is actuated by the closing and opening coils 72 and 73. Blades 68 and 69 of the switch 70′ are actuated by the member 74 which in turn is actuated by the closing and opening coils 75 and 76. Secured to and operated by members 71 and 74 are the auxiliary circuit closing members 77 and 78. Circuit closing members 77 and 78 in the open position of the switches 70 and 70′ close break points in the conductor 79. Conductor 79 is connected at one end to power lead 62 of the supply lines, and at its other end is connected to one terminal of each of the closing coils 72 and 75. The other terminals of the closing coils 72 and 75 are connected by means of conductors 80 and 81 to the galvanometer contacts 14 and 15 which in turn are connected to the power supply lead 61 by conductors 81′ and 59. The opening coils 73 and 76 have one terminal thereof connected by means of the conductors or leads 82′ to the leads 64 and the switch blades 66 and 68 respectively and have their other terminals connected by means of the conductor 83 through the switch member 29 when closed, and lead 59 to the power lead 61. Connections paralleling those to motor 46 are connected to the fuel supply valve control motors 84 and 107 in the manner to be described hereinafter. The present invention resides in the relative operation of the above described control apparatus and the motors 84 and 107 controlling the fuel supply valves in accordance with their operation by the control apparatus.

The apparatus so far described may in practice be applied to the regulation and maintenance of constant temperature conditions with substantially no hunting. Thermocouple 57 is located as pointed out above either in the oil preheater outlet or in the tower, or in any place where the temperature is to be regulated. The potentiometer 55 is adjusted in such a manner that with temperature conditions at the thermocouple at the value it is desired to maintain, the galvanometer coil is positioned so that pointer 3 is in normal or zero position.

Motor 27 rotates the shaft 26 continuously so that the cam 25 actuates the depressor bar 21 to periodically raise and lower the pointer 3. With the galvanometer in zero position, the member 6 will move vertically between the contact springs 7 and 8 so that neither of the sets of contacts 9 and 14 nor 10 and 15 will be closed.

When the temperature at the thermocouple drifts away from the predetermined normal temperature condition a deflection in the galvanometer will be produced with the result that the pointer 3 will be shifted either to the left or to the right position and extension 6 will be positioned over the spring 7 or 8 in accordance with the direction of the deflection of the needle or pointer. Assuming that the deflection is produced by a drop in temperature at the thermocouple and the needle 3 swings to the left in Figure 1, as the depressor bar 21 moves downward, contact 9 will be forced into engagement with the contact 14 and an energizing circuit will be completed from conductor 61 through conductor 81′, contacts 9 and 14, conductor 81, the closing coil 75, of the switch 70′, conductor 79, auxiliary switch members 78 and 77 of switches 70′ and 70 to the conductor 62.

Coil 75 energizes, closes the switch 70′, and completes a circuit from the power leads 62 and 63 through the switch blades 68 and 69 to the leads 64 and 65 respectively of the motor 46. As switch 70' closes the motor circuit the energizing circuit for the closing coil is interrupted by the movement of the circuit closing member 78 to the right in switch 70' with the resulting opening of the conductor 79. Motor 46 starts into rotation and drives the shaft 40 which through the gear 38 will drive the pinion 20 to cause the rotation of the contact table 13 in the direction of the deflection of the galvanometer needle.

As the movement of the shaft 26 continues and after a predetermined amount of rotation of shaft 40 has occurred, cam 28 will close the switch 29 and will complete an energizing circuit from conductor 61 through conductors 59 and 83, switch 29, coil 76 of the switch 70', conductor 82 to the switch blade 68 and the power lead 62. Coil 76 will be energized and will open switch 70' which in turn will cut off the power supply from the motor 46 and cut off the energizing current from the coil 76. Motor 46 will then come to rest, the depressor bar will be on its upward movement, and cam 30 will cause the member 37 to reciprocate on the shaft 40. As reciprocating movement of the member 37 occurs the spring 19 will shift the contact table back a distance of one tooth of the gear 20, the parts being so proportioned and arranged that normally a plurality of return steps of the contact table under control of the escapement mechanism are required to effect the return thereof to zero or normal position. If the galvanometer deflection is such at the end of the first correcting cycle that the contact spring 7 is positioned beneath the pointer extension 6, when the bar depresses the pointer 3 in the cycle of operations contacts 9 and 14 are again closed, the motor 46 will be started into operation to take a further step and the contact table 13 will be rotated still further to the left of Figure 1. As the fuel supply is increased sufficiently the temperature at the couple will rise and the galvanometer pointer will start to return to the normal or zero position. The motor 27 will continue to operate the escapement however, causing the table 13 to return to normal. The rate of return of the contact table 13 is controlled by the escapement mechanism to be suitably related to the temperature recovery after a correction in the fuel supply has been made. If the temperature returns to normal at such a rate that the galvanometer pointer and needle table return to normal at equal rates no further correction will be made until a further deviation occurs.

When the temperature rises above the normal or predetermined value, the galvanometer pointer 3 will shift to the right in Figure 1 and the contacts 10 and 15 will be closed as the bar moves downward. Under these conditions the closing coil 72 of the switch 70 will be energized through a circuit from the power lead 61, conductors 59, 81', contacts 10 and 15, conductor 80, coil 72, conductor 79, the circuit closing members 78 and 77 to the power lead 62. This will close blades 66 and 67 of the switch 70 and will connect the lead 64 of motor 46 to the power supply lead 63 and will connect the lead 65 to the power supply lead 62. Motor 46 will rotate in the reverse direction and move contact table 13 to the right. The closure of the switch 70 interrupts the energizing circuit for the closing coil 72 by the movement of the circuit closing member 77 to the right. Cam 28 will operate to close the switch 29 as above set forth and an energizing circuit will be completed through opening coil 73 of the switch 70 from the power lead 61 conductors 59 and 83, coil 73, conductor 82', to the switch blade 66 and power lead 63. Opening of the switch 70 will interrupt the energizing current and the power supply to the motor 46 and the parts will come to rest; as the rotation of the shaft 26 continues escapement member 37 will be reciprocated under the influence of the cam 30 and the contact table will return toward normal under the influence of spring 18 a step at a time in the manner set forth above. If the pointer and table do not return to normal at the same rate, contacts 9 and 14, or 10 and 15 will be operated causing corresponding operations of motor 46 which will adjust the fuel supply and will tend to cause the rate of return to normal of the temperature to proceed at a rate predetermined by the rate of return of the table.

The operation and proportioning of parts is preferably such that for each degree of deviation of the temperature from the normal or predetermined value, one step of the apparatus will be taken. In the form shown the steps are all of equal length but by utilizing well known control galvanometers of the form in which the time the contacts are closed depends upon the amount of deflection, the steps may be made proportional in length or interval to the amount of deflection of the pointer from the position between contact springs 7 and 8.

Referring now more particularly to Figure 2, the fuel varying mechanism operated by the above described controller in accordance with my invention is shown in detail. Motor 84 suitably mounted on the base 84' drives the worm 85 connected to the motor shaft 86'. Worm 85 meshes with worm wheel 86 suitably mounted on shaft 87, through which it drives pinion 88. The gearing 89 comprises a double pinion 89' and 91 which transmits power from shaft 87 through pinions 88 and 89' and shaft 90 to the crank disc gear 92.

Secured to the crank disc gear 92 for rotation therewith is the crank disc 94 to which one end of a link 95 is secured at 96. The other end of link 95 reciprocates in guide 97. A connecting lever 99 is pivoted to the link 95 at 100 by a pin and slot connection which allows oscillation of link 95 by the eccentric. The lever 99 is also connected at 101 to a cross bar lever 102 and is also pivoted to members 98 and 103. As the link 95 reciprocates, the connecting lever 99 is rocked about pin 103 as a pivot.

The cross bar lever 102, has its outer end secured to the valve operating lever 104 at 102'. As the connecting lever 99 oscillates about the pivot 103, this movement is transmitted through cross bar lever 102 and rocks the valve operating lever 104 about its pivot 105, through which the fuel valve 106 of the usual type is operated to its open and closed position. A second cross bar lever 103' is connected to lever 99 and is adapted to operate an air valve 106' through the lever 104' as clearly shown in Figure 2.

A second motor 107 is properly supported on the base 84' and drives a shaft 108 which carries a pinion gear 109 at its other end. Pinion gear 110 meshing with gear 109 is rotatably secured to shaft 111 and drives the wide face pinion 112. Gear 113 rotating on the worm 114 moves between clutches 115 and 116. Gearing 117 comprises a pinion 118 secured to the worm 114 which is driven when the pinion gear 113 engages either clutch member 115 or 116. Member 120, moving along the worm 119, moves the link 121 secured at one end to member 120 and at its other end at 122 to the member 98. As the member 121 is moved, it rocks the member 98 about its pivot 122'. It is evident from the above that the connecting rod 99 may either be rocked about pin 103 as a pivot by the reciprocal movement of link 95 or may be rocked about 100 as a pivot by the movement of member 98 operated by link 121.

The motor 107 is reversible, the direction of rotation depending on the circuits completed as will be described hereinafter. Circuits for motor 84 are completed over conductor 127 to the terminal contacts controlled by the limit switch 128 which is of the well known snap acting type. The snap acting switch 128 is pivoted to the base 84' at 129 and secured to the lever 95 at 130. When the motor 84 has operated to rotate the crank disc 94, 180°, the lever 95 moves with a snap action a distance sufficient to operate the switch 128 to break its upper contact 131 and close its contact 132. With the circuit for motor 84 prepared as shown over contact 131 and conductor 127, the motor will rotate in a direction to close the valve 106 and to simultaneously operate the limit switch 128 to open contact 131 and close 132. This circuit depends however, upon the closing of the switch 67 by the control apparatus as described above. The contact 131 is connected by conductor 133 to the high contact side 67 of the control apparatus and the contact 132 is connected by conductor 134' to the low contact side 68 of the control apparatus.

As pointed out in the description of the operation of the invention the motor 84 may be operated either to effect a rotation of the crank disc 94 through 180° in one step or, if preferred, it may be caused to effect the 180° rotation of crank disc 94 in a series of steps.

When the motor 84 is operated to rotate disc 94 through 180° in one step, it preferably is used as a non-reversible motor and is operated to effect an opening and closing action of the valves by successive rotation of crank disc 94 through 180° in one direction. The direction of rotation of the motor 84 is the same regardless of whether it is energized through the high or low side of the control instrument. The direction of valve movement effected by motor 84 is determined by limit switch contacts 131 and 132, one or the other of which is in contact making position as determined by the direction of valve movement last made. The valves are always moved through the limit of movement possible by motor 84 from opened to closed and from closed to opened position in alternate succession.

When the motor 84ᴬ is to be operated step by step between the limits of operation of the valve, it is used as a reversible motor and the limit switch 128 is of the ordinary type in contradistinction to the snap action type. The motor 84ᴬ is then connected in parallel with motor 107. With motor 84ᴬ so arranged, when the limit switch is in intermediate position the motor, and the valves, may be operated in either direction in any order and the valves may take up a stable position between the extremes of valve movement possible by operation of motor 94.

In Fig. 2 the motor 84 is shown connected and arranged for non-reversible operation.

In Fig. 3 the circuit connections are diagrammatically shown for operating the motor 84ᴬ reversibly.

The motor 107 is connected by conductor 135 to the contact 136 and by conductor 137 to contact 138 of limit switch 140. The contacts 136 and 138 are controlled by the switch 140 pivotally mounted at 141 to the base 84' and pivotally secured to arm 142 which in turn is pivoted to the member 98. As the member 98 is rocked about pivot 122', the arm 142 is moved to operate the limit switch 140, disengaging contact 136 and engaging contact 138 when the motor 107 has operated its limit, normally, however, this switch maintains its contacts 136 and 138 closed. With the limit switches in the position shown, motor 107 will rotate in a predetermined direction when its circuit is completed by the control apparatus.

The motor 107 is a 3 phase motor connected in parallel with the 3 phase motor 46 so as to be operated to make a valve closing movement when the switch 70 is closed and operated to make a valve opening movement when switch 70' is closed.

In order to better illustrate the invention, a detailed description of the operation which takes place when the controlled temperature deviates from normal will now be given. It will be assumed that there has been a previous control due to a temperature drop in the furnace below the desired amount and the switches for both motors are in the position shown in preparation for a control operation due to a temperature rise above the desired value. If now the temperature being controlled rises above the desired value, the control apparatus operates to close the switch 70 which is operated by the making of the controller high contacts 10 and 15.

Circuits are thereupon completed for both the motors 84 and 107. The circuit for motor 84 extends from the source of power over the blade 67 of switch 70, conductor 133, through the contact 131, conductor 127 to the winding of the motor 84 and over conductor 139 to the source of power. A circuit is completed for the motor 107 from the source of power over the switch blades 66 and 67 of switch 70, conductors 133 and 134', contacts 136 and 138, conductors 135 and 137 to the motor 107, the other phase of the circuit to the motor 107 being completed over conductor 138 to the source of power. It will be noted that the circuit for the motor 84 is completed through the contact 131, controlled by the limit switch 128 which is in turn operated by motor 84 through link 95. The circuit for the motor 107 is completed through the contacts 136 and 138 and is opened by the action of the limit switch 140 after the motor 107 has operated to its limit.

As a result of the energizing circuits traced above, both motors rotate. The rotation of the motor 84 operating through the gear mechanism drives the crank 96 and through it, the link 95 moving connecting lever 99 about its pivot 103. The lever 99 drives cross bars 102 and 103', which in turn operate to close the valves 106 and 106' respectively through the valve operating levers 104 and 104'. The control instrument operates to maintain switches 70 and 70' closed through a predetermined time for each cycle of operation. With motor 84 arranged in circuit as shown in Fig. 2, the motor 84 is operated to turn the crank disc 180° upon its first actuation. Simultaneously the limit switch 128 is operated with a snap action as a result of the movement of the link 95 to its limit to open the contact 131 and close contact 132. Since contact 132 is connected to the low contact side 69 of the controller over conductor 134, the motor 84 is now rendered non-operative for further closing of the valve should the control continue to close its high contact side 67.

During this period while motor 84 is operating although the motor 107 is rotating driving the pinion 113 through the gear mechanism including pinions 109 and 110, this is not effective at this time to control the valve due to the back lash or lost motion while pinion 113 is moving along the worm 114 towards the clutch 116 and is therefore at this time not transmitting any energy for operating the valves. If however, after the valves have been operated to the maximum position attainable by the motor 84 the temperature is not restored to the predetermined value and the controller therefore continues to close contact 67 the further rotation of motor 107 rotates the pinion 113 until it engages the clutch 116. Thereafter it will transmit the power from the motor 107 through to the link 121 for rotating the member 98 about its pivot 122'.

The connecting member 99 is thereupon operated through pin 103 by which it is secured to member 98 and moves about 100 as a pivot to in turn move the lever 102 to the right as in the case of its movement under control of motor 84 described above. The valve operating lever 104 is now operated a further step. In this manner the valve will continue closing in steps until there is a sufficient reduction in the fuel supply to restore the temperature to the predetermined condition. As a result of the step by step operation of the valve by the motor 107 new valve limits are obtained so that the operation of the motor 84 will now normally operate the valve mechanism between the limits which are different than those for which the valve was originally adjusted. For each periodic operation of the controller closing the contact 67 motor 107 will operate the valve in the manner described above until the temperature drops to the predetermined value. At the limit of its movement, however, the limit switch 140 will move to disengage its contact 136.

If the temperature drops below the value at which it is to be maintained, the controller Figure 1 operates to engage its low contacts 9 and 14 thereby closing switch 70'. A circuit will be completed for the motor 84 from the source of power over the switch blade 68 of switch 70', conductor 134', contact 132, now closed by the limit switch 128, conductor 127, motor 84 and over conductor 139 to the source of power. This circuit completed over conductor 127 rotates the motor 84 which in turn drives the valve mechanism 106 from a substantially closed to open position between the new limits determined by the previous operation thereon by motor 107.

If the valve having been operated to its maximum open position still does not sufficiently increase the fuel supply to restore the temperature to its normal value, the control apparatus will continue to close the switch 70' repeatedly. During this period a circuit is completed for motor 107 from the source of power over blades 68 and 69 of switch 70, conductors 133 and 134, contacts 136 and 138, conductors 135 and 137 to motor 107, the other phase of the circuit being completed to motor 107 over conductor 138. The motor rotates in the reverse direction from that described above.

While the control apparatus periodically closes the contact on its low side, the motor 107 drives the gear 113 over the worm 114 in the reverse direction from that described above to take up the back lash due to the movement of the gear 113 from the clutch 116 to the clutch 115. If after this period, the temperature still does not attain the desired value, motor 107 will operate the valve 106 through clutch 115 and lever 121, member 98 and levers 99, 102 and 104.

From the above description, the operations will now be apparent. While a single motor may be arranged to add or subtract a certain amount of fuel to or from a predetermined normal amount for every change in temperature, it cannot change the normal amount to take care of abnormal changes in the temperature of the furnace. For this reason, the second motor is brought into operation, if after an interval of time, the operations of the first motor have failed to restore the condition to its normal value, and adds or subtracts from the definite amount of operation of the first motor.

When the motor 84 is arranged for a complete opening or closing action of valve 104 in a single step, the motor 84 operates to effect an on and off control between narrow limits. The limits of operation of the valves by motor 84 are made as narrow as circumstances will permit to take care of ordinary fluctuations of the temperature or other measured condition under control. Accordingly, the motor 84 alone operates to maintain the measured temperature within a narrow range, within which the temperature hunts, the fluctuation of the temperature within the narrow range causing operation of motor 84 which increases and decreases the fuel supply to cause the temperature to swing back and forth within the narrow temperature range. If the motor 84 alone were used to effect the control, it would be necessary to widen the limits of operation of the valves by it so as to provide a change of heat supply which would be effective to counteract any change in conditions, such as fuel quality and pressure, atmospheric temperature and humidity, load on furnace, et cetera, however great such change might be. Under such conditions the temperature range which it would be possible to maintain by automatic control would be far too large. By the use of motor 107, which acts to change the range or limits through which the valves may be operated by motor 84, it is possible to make that range narrow and correspondingly to make narrow the range within which the temperature may be maintained by automatic control.

After the fuel valve has been operated to its limit by the motor 84 and the temperature does not change accordingly during a reasonable period of time which depends in each case upon local conditions and may adjustably be varied by the amount of back lash, determined by the positions of clutches 115 and 116, it is obvious that further adjustment of the valve is required. This is accomplished through the operation of motor 107 which transmits power through one of the clutches 115 and 116 for operating the valve beyond the limits to which it is operated by motor 84.

It should be apparent from the description above, that when a change in temperature occurs the motor 84 performs the first or initial operation on the valve. After the motor 84 has operated the valve to its limit and the temperature condition still continues off normal the motor 107 becomes operative to further move the fuel valves after a reasonable interval of time adjustably determined by the back lash provided in the position of the clutch members.

The mode of operation of the control system as a whole, that is, the control instrument of Fig. 1 and the two motor mechanism of Fig. 2 combined and electrically associated in the manner hereinbefore described, will now be described. Let it be assumed by way of illustration, that the control system is applied to a furnace, that the instrument measures by a thermocouple the temperature of the material being treated, oil for example, the temperature of which is to be maintained constant, that the valve 106, (and valve 106' for steam or air also if desired), be in the fuel oil line so that adjustment of the valve will adjust the fuel supply and accordingly the heat supply to the furnace.

When the furnace, specifically a tube still, is brought into operation the exit oil temperature, to be maintained constant, is abnormally low. Accordingly, the deflecting member of the meter tends to take up a position down-scale considerably below the control point of the instrument. The down-scale tendency of the pointer 3 brings it over low contacts 9 and 14, overshooting being prevented by a stop 12 on the movable contact table. The continuously operating motor 27, through cam 25 and depressor 21, moves pointer 3 periodically to make low contacts 9 and 14. Making of contacts 9 and 14 closes switch 70' which remains closed when pointer 3 is released until cam 28 and switch 29 opens it. While closed, switch 70' operates motor 46 to move the contact table in the direction of pointer deflection, downscale; also, switch 70' operates motor 84 in one step through the full range of valve movement which is possible by operation of motor 84, provided such an adjustment had not been made previously; also, switch 70' operates motor 107 a step proportionate to the time switch 70' is closed. Since the measured temperature is abnormally low the initial movement of the contact table does not move contacts 9 and 14 clear of pointer 3, accordingly switch 70' is again closed followed by the consequent operation of motors 46 and 107, motor 84 not being operated again so long as the pointer 3 is moving in the same direction, downscale, because of the actuation of limit switch 128 upon the initial valve opening operaton of motor 84. So long as the pointer 3 moves downscale the above described operations are repeated. The motor 107 eventually moves gear 113 into engagement with the proper clutch 114 or 115, if not previously so engaged, so that further operation of motor 107, through members 121, 98, 99, 102 and 104 effects a further opening of valve 106 to increase the fuel supply. The abnormally low temperature incident to starting the furnace will cause the controller to operate motor 107 to its limit as determined by limit switch 140 thereby admitting a maximum supply of fuel. During the above described operation of the control instrument the escapement 20, 38, 39 allows repeated small steps of the contact table back toward neutral. However, under the conditions specified, the adjustment of the contact table by motor 46 is the predominating effect and causes the table to follow the pointer to its limit of movement. After the table has been moved to the position where the pointer 3 is at rest the escapement will allow such table movement as to bring the low contacts 9 and 14 into engageable position relative to the pointer thereby operating motor 107 to its limit, if the motor has not been so operated, and also operating motor 46 to re-adjust the contact table, these latter escaping and re-adjusting movements of the table continuing so long as the pointer remains at rest in the downscale position.

The fuel valve mechanism is so designed that under normal operating conditions a sufficient supply of fuel will be provided when the valve is in an intermediate position. Accordingly, the fully open position of the valve, due to starting the furnace, produces a supply of heat necessary and sufficient to raise the temperature of the furnace and oil but greatly in excess of the heat supply sufficient to maintain the desired exit oil temperature once it has been established. Such an excess of heat supply tends to cause overshooting of the exit oil temperature. To prevent such overshooting, either altogether or partially, it is necessary to reduce the heat supply in anticipation of the arrival of desired exit oil temperature. On the contrary it is desirable to bring the exit oil temperature and general furnace operating conditions to normal as quickly as possible. In order to meet both of these conflicting desiderata it is necessary to maintain a maximum heat supply as long as possible and then to reduce the heat supply quickly. Other conditions of desirable operation incident to maintaining the tube still in normal operation, which will be considered hereinafter, must be met.

As the measured temperature starts to rise the pointer begins to move upscale and, due to the action of the escapement, the contact table likewise moves up-scale. However, the rate of heat supply is such as to cause the pointer 3 to move up-scale more rapidly than the escapement permits the contact table to move so that the pointer 3 is moved into position relative to the table for actuating high contacts 10 and 15. Actuation of high contacts 10 and 15 takes place similarly to the actuation of contacts 9 and 14 and results in closing switch 70. When closed, switch 70 operates motor 84 to its limit in one step in a direction to partially close valve 106 thereby reducing the fuel supply substantially; switch 70 also operates motor 46 to move the contact table to follow the pointer; and switch 70 operates motor 107 in the reverse direction to its previous operation thereby moving gear 113 away from the clutch which it previously engaged. The initial large valve adjustment by motor 84 allows the controller to be used so as to maintain maximum fuel supply for maximum time and then to reduce the fuel supply quickly. The movement of the contact table by motor 46 brings its neutral in register with the pointer thereby tending to prevent further operation of contacts 10 and 15. The reduction in valve opening due to operation of motor 84 reduces the rate of temperature rise considerably, however, the extent of valve adjustment for which motor 84 is designed is determined largely by factors, later to be considered, and is not sufficient to check the temperature rise, therefore the heat supply usually will still be sufficiently great to cause overshooting of the exit oil temperature. The escapement mechanism is designed to cause the control table to move toward the control point of the instrument at a rate which is determined largely by those characteristics of steady furnace operation which determine the rate at which the exit oil temperature may vary from normal. Therefore, the rate of movement of the control table is slow and the pointer 3 will advance into position for actuating high contact 10 and 15 as it moves toward the desired temperature position. Such actuation causes further operation of motor 107 with corresponding movement of gear 116 from one clutch toward the other clutch and operation of motor 46 to adjust the contact table so as to bring its neutral into alignment with the pointer. Such operation continues as the pointer moves upscale, the gear 116 eventually engaging the clutch and operating to further reduce the valve opening thereby reducing the heat supply and the rate of temperature rise. Since the heat supply at the start was greatly in excess of that required for steady operation of the furnace and since the characteristics of the furnace during steady operation largely determine the design of the control mechanism, the operation of the controller in reducing the supply of fuel during the rise in the temperature of the exit oil ordinarily is not sufficient to prevent overshooting of the exit oil temperature, however, the extent of overshooting is greatly reduced by the above described operation of the automatic control mechanism.

As the temperature rises above the desired exit oil temperature the pointer 3 continues to make contacts 10 and 15 and to operate motor 107 to close valve 106 further; also motor 46 is operated to move the table upscale to follow the pointer. As the controller continues to so operate the heat supply is diminished more and more and the rate of increase of exit oil temperature decreases until temperature stops rising and begins to fall. The extent to which the exit oil temperature overshoots the desired temperature and to which the valve position overshoots the optimum position is small compared to extent of overshooting incident to starting the furnace in operation because of the anticipating action of the control mechanism. Therefore, the rate of temperature fall is slow and approximates that rate of temperature fluctuation which obtains during steady operation of the furnace and the rate of movement of the pointer 3 down-scale toward the control point of the instrument will approximate the rate of return of the contact table. If the pointer lags behind the table the high contacts will be made and the valve opening further reduced by the slow acting motor 107. If the pointer leads the table the low contacts will be made and the motor 84 operated to make a large opening increment in the valve 106, simultaneously motors 107 and 46 are operated as before described, the motor 107 acting to move gear 113 away from the valve closing clutch. The action of motor 84 greatly reduces the rate of temperature fall and will approximately stabilize the temperature of the exit oil at an even level. This action will take place when the exit oil temperature is approximately that desired and the furnace proceeds in steady operation.

During steady operation of the furnace the exit oil temperature approximates the optimum and the heat supply approximates that which is necessary to replace the heat losses continually taking place so that the heat flow or transfer is in approximately steady state and the rate of exit oil temperature fluctuation is small. Inasmuch as the temperature to be held constant is the measured temperature actuating the controller it is obviously necessary that the measured temperature must fluctuate about the optimum temperature slightly to actuate the controller. It is desirable to maintain that range of fluctuation as small as possible, accordingly when the temperature rises above or falls below the optimum temperature it is desirable to change the heat supply as quickly as possible and in a direction and to an extent such as to cause the temperature trend to reverse as quickly as possible. Such operation is made possible by the use of motor 84. When the temperature is rising the limit switch 128 will be in position to permit a closing increment of valve by operation of motor 84. When the pointer reaches a position to actuate the high contact the motor 84 will be operated in one step to effect such a closing action in valve 106 as to reduce the heat supply immediately and sufficiently to stop further temperature rise and cause the temperature to fall which will continue until the pointer makes the low contacts when the reverse operation takes place causing a reverse of temperature trend. The motor 107 is actuated simultaneously with the operation of motor 84 but due to the lost motion between gear 113 and its clutches it usually does not operate the valve. Sufficient lost motion is provided to allow time for the change in heat supply by motor 84 to affect the exit oil temperature. Thus motor 84 is operated by the controller to cause the exit oil temperature to oscillate between narrow limits about the optimum temperature. When furnace operating conditions change so much that the range of valve movement by motor 84 will not compensate for the changed heat transfer conditions the motor 107 is operated to adjust the valve thereby, in effect, changing the limits of valve operation for motor 84. Such changes which necessitate the operation of motor 107 ordinarily occur gradually so that the motor 107 operates slowly. Such operation of motor 107 takes place as follows: As the changing furnace conditions tend to cause the exit oil temperature to fall for example, the low contacts are made more frequently than the high contacts, the motor 84 operating to maintain the exit oil temperature between the desired limits. Such unbalanced operation of the high and low contact operates motor 107 to take up the lost motion between gear 113 and the valve opening clutch so that eventually motor 107 will operate valve 106 to increase the heat supply sufficiently to compensate for the deficiency in heat transferred which tends to cause the exit oil temperature to fall. This control action can and usually will take place without allowing the exit oil temperature to depart from the predetermined range about the optimum temperature. Sudden large changes in furnace operating conditions are taken care of in the manner described in connection with the starting of the furnace.

From the above description of the mode of operation of this invention it is seen that the control instrument, because of the contact table follows the pointer, operates in accord with temperature trend and therefore provides a stabilizing control action, the more rapid the rate of temperature change the more counteracting control action is exerted thereby preventing the system under control from getting out of hand; that, due to the escapement, the control instrument is biased to a predetermined operating temperature to which it proceeds while continuously exercising a strong stabilizing control action on the furnace; that the controller operates, by virtue of motor 84 to maintain the measured temperature within exceedingly narrow limits; and that, by virtue of motor 107 it compensates for cumulative temperature trends. Thus a controller is provided which functions in a plurality of ways, each of its functions being best adapted to produce a desired control effect, the combination and interaction of such control functions in one controller making it possible to so design the controller that the desired control effects largely determine such allotment of control action to the various control functions conducive to the highest degree of closeness of control and the maximum of flexibility for satisfying the many and conflicting requirements for optimum operating condition of the system under control.

The above description of the mode of operation of this invention is confined to the case where the motor 84 is non-reversible and is operated in a single step to effect the maximum valve change operation of which it is capable. When the motor 84A is used as a reversible motor in parallel with motor 107 operating rapidly but in a plurality of steps between its limits of operation, the mode of operation of the invention as above outlined is substantially the same. Whether the motor be used to operate in a single step or in a plurality of steps, its chief function is to provide a stabilizing action which takes place quickly and produces a sufficient change in the heat supply to cause a reversal of temperature trend when the tendency of the temperature to depart from normal is that normally encountered in steady operation of a furnace. In some cases it may be of advantage to use the motor 84 operating between its limits of plurality of steps in order that the motor 87 may take up a position intermediate of its limits which will more nearly correspond to the optimum temperature which it is desired to maintain, thus the temperature may be caused to line out upon the optimum temperature desired whereas by contrast, when the motor 84 is operating throughout its range in a single step the temperature will be caused to fluctuate within narrow limits about the optimum temperature and never be allowed to settle down or line out upon the optimum temperature.

In the above description, the invention is described as applied to the shifting of valves in a fuel line. It is obvious, however, that the invention is also applicable to other methods of controlling fuel supply as for example changing the ratios of a transformer or shifting a contact on a resistance. It will be noted also that a controller with an escapement return is illustrated although any other form of controller such for example as those operating on the principle of graded control in accordance with the extent of departure of the temperature from normal, may be employed.

In the preferred form of my invention, I have disclosed the motors operated from the same point in the furnace. It is obvious however, that the control can be accomplished from a different furnace position for each motor. For example, the most important temperature in tube still oil cracking processes is the temperature attained in the tower. Variations in tower temperature occur due to changes in the oil outlet chamber and to independent causes such for example as weather changes. Such variations of temperature in the tower occur so late that they have heretofore not been effectively available to control the heater, and it has therefore been found most expedient to control the temperature from outlet oil temperature of tubular stills, the nearest position to the tower at which temperature variations occur in time control the heater in reasonably satisfactory manner. Such controls cannot, however, correct for tower temperature extraneous conditions such as weather conditions. I have discovered that it is practical to control the fuel supply from the tower temperature with the mechanism heretofore described by controlling the motor 84 in accordance with the outlet temperature of the oil to maintain the oil outlet temperature substantially constant, and controlling motor 107 from the tower temperature so that if the tower temperature varies with a given oil outlet temperature, the oil limits of the mechanism will be changed to change the oil outlet temperature being maintained to maintain a predetermined tower temperature. In this way it will be seen that a novel and effective tower temperature control correcting for oil temperature as well as extraneous conditions is provided.

My improved controls may be further modified by operating motor 84 from the temperature of the combustion chamber instead of the oil outlet temperature and motor 107 from the tower temperature, providing another effective means of maintaining oil at a predetermined temperature in a practically satisfactory manner.

Although I have illustrated my invention in connection with temperature control in a tubular oil still and with a particular type of "graded" or follow-up contacting galvanometer controller having an escapement return mechanism, it will be apparent to those skilled in the art that my invention has broader applications in the control art and that any well known "graded" or "on and off" types of contacting galvanometer or other control mechanism may be utilized, and I do not intend to limit myself by the specific application herein shown, but only insofar as set forth in the appended claims.

I claim:

1. In a control system, a device to be maintained at a predetermined temperature, a motor mechanism for controlling the rate of fuel supply to said device and a control mechanism for variably operating said motor mechanism in accordance with the variations in temperature of said device from a predetermined temperature, said control mechanism comprising a galvanometer with a pointer movable from a normal position in accordance with the departure of said temperature from said predetermined value and contacts controlled by said pointer when deflected from its normal position, the contacts being arranged to move in the direction of the deflection of said pointer, said motor mechanism being arranged under predetermined conditions to be non-operative to vary said fuel supply in response to the first few operations thereof by said control mechanism.

2. In a control mechanism, a device to be maintained at a predetermined temperature, a motor mechanism for controlling the rate of fuel supply to said device and a control mechanism for variably operating said motor in accordance with the variations in temperature of said device from a predetermined temperature, said control mechanism comprising a galvanometer with a pointer movable from a normal position in accordance with the departure of said temperature from said predetermined value and contacts controlled by said pointer when deflected from its normal position, the contacts being arranged to move in the direction of the deflection of said pointer, said motor being non-operative to control the fuel supply under predetermined conditions for the first few operations thereof by said control mechanism and a second motor for varying the fuel supply, said second motor being operative during said period while said first mentioned motor is non-operative.

3. In a control system, a device to be maintained at a predetermined temperature, a fuel control device, means for varying said fuel control device between predetermined limits, a second means for controlling the fuel control device for varying said limits between which said first mentioned means operates said control device, a control mechanism comprising a galvanometer with a pointer movable from a normal position in accordance with the extent of variation of said temperature from said predetermined temperature, contacts controlled by said pointer when deflected from its normal position and arranged to move in the direction of said pointer, said control mechanism being arranged to operate said first mentioned means when said pointer is deflected to vary the rate of fuel supply to said device between said limits and arranged after said first mentioned means has operated said fuel supply to its limit to operate the second mentioned means to extend said limit, in the event the temperature continues to remain off normal.

4. In combination, a device to be maintained at a predetermined temperature, a control mechanism, temperature responsive means for variably operating said control mechanism, a first motor controlling the rate of fuel supply to said device, a second motor for controlling the rate of fuel supply to said device, periodically operating means cooperating with said control mechanism for selectively operating said first and second motors at different rates and to different limits respectively and means controlled by said control mechanism and periodic means for varying the operation of said control mechanism whereby said motors are operated in accordance with the rate of change of the temperature of said device.

5. In combination, a device to be maintained at a predetermined temperature, a control mechanism, temperature responsive means for operating said control mechanism so long as the temperature differs from the predetermined normal temperature, an initial motor for controlling the rate of fuel supply to said device, a floating motor for controlling the rate of fuel supply to said device, periodically operating means cooperating with said control mechanism for selectively operating said initial and said floating motors at different rates and to different limits respectively and means controlled by said control mechanism and periodic means for varying the operation of said control mechanism whereby said control mechanism responds to the rate of change of the temperature of said device.

6. An automatic system for producing or maintaining a predetermined condition comprising means responsive to departure from said predetermined condition, first and second motor means selectively and variably operated by said first named means for decreasing, by increments which vary with the magnitude of said departure, the rate of change of a quantity in response to which said departure from said predetermined condition is reduced and said predetermined condition attained and timing mechanism for determining the time in which said first and second motor means cooperate to establish a predetermined condition.

7. An automatic system for producing or maintaining a predetermined condition, comprising a mechanism responsive to the departure from said predetermined condition tending to render itself inoperative before said predetermined condition is established, an initial motor mechanism and a floating mechanism selectively and variably controlled by said automatic mechanism for establishing said predetermined condition, and mechanism controlling said automatic mechanism to prevent it from rendering itself inoperative until said means establishes the predetermined condition.

8. The combination, with a device to be heated, of means for delivering heat thereto, automatic mechanism responsive to the departure of said device from a predetermined temperature, comprising a temperature responsive device, a deflecting member controlled thereby, an initial motor mechanism operable between predetermined limits by said deflecting member, a floating motor selectively and variably controlled by said deflecting member when deflected for varying the heat input to said device, means controlled by said deflecting member tending to cause said automatic mechanism to become non-operative for any temperature to which the temperature responsive device is subjected, and means for preventing said mechanism from becoming non-operative until said device attains said predetermined temperature whereby the heat input into said device is varied until said predetermined temperature is attained.

9. In combination with a device to be heated of means for delivering heat thereto, an initial motor mechanism, floating mechanism for controlling the rate of delivery of said heat delivering means, said initial motor mechanism being operable to control the rate of heat delivery between predetermined limits and said floating mechanism being arranged to change said limits, automatic means responsive to the departure of said temperature from a predetermined temperature comprising a device responsive to the temperature of said furnace, an electric circuit controlled thereby, a galvanometer in said circuit having a deflecting member for controlling said initial and floating motor mechanism and means controlled by said deflecting member when deflected to cause the variation in said heat delivery to said device by means of decreasing increments which vary with the magnitude of said departure.

10. The method of predetermining temperature which comprises varying the supply of heat in large quantities with a variation of temperature from a predetermined temperature and thereafter varying the heat supply at regular intervals in small increments of predetermined magnitude as long as the temperature is away from the predetermined temperature.

11. In combination, a device to be maintained at a predetermined temperature, a fuel supply therefor, a first motor for controlling the rate of fuel supply to said device, a second motor for controlling the rate of fuel supply to said device, a control mechanism comprising a galvanometer and a deflecting member, means responsive to the variations in temperature of said device from said predetermined value for deflecting said member, means controlled by said member when deflected for selectively operating said motors to effect different rates of fuel supply respectively, means controlled by said motors to vary the fuel supply for restoring said temperature to the predetermined value and means operated by said deflecting member tending to render said control mechanism non-operative to control said motors.

12. In combination, a device to be maintained at a predetermined temperature, a fuel supply therefor, a first motor for controlling the rate of fuel supply to said device, a second motor for controlling the rate of fuel supply to said device, a control mechanism comprising a galvanometer and deflecting member, means responsive to the variations in temperature of said device from said predetermined value for deflecting said member, means cooperating with said member when deflected for operating said motors at different predetermined rates and to different predetermined limits respectively, means controlled by said motors for varying the fuel supply to restore said temperature to the predetermined value, means whereby one of said motors is rendered non-operative after an interval of time and means whereby said cooperating means is operative following said operations of said motors tending to render said member non-operative to control said motors.

13. In combination, a device to be maintained at a predetermined temperature, a fuel supply therefor, a first motor for controlling the rate of fuel supply to said device, a second motor for controlling the rate of fuel supply to said device, a control mechanism comprising a galvanometer and a deflecting member, means responsive to the variations in temperature of said device from said predetermined value for deflecting said member, periodic means cooperating with said member when deflected for operating said motors at different predetermined rates and to different predetermined limits respectively, means controlled by said motors for varying the fuel supply to restore said temperature to the predetermined value, and means controlled by said periodic means and member tending to render said control mechanism non-operative to control said motors.

14. In combination, a device to be maintained at a predetermined temperature, a fuel supply therefor, a first motor for controlling the rate of fuel supply to said device, a second motor for controlling the rate of fuel supply to said device, a control mechanism comprising a galvanometer and a deflecting member, means responsive to the variations in temperature of said device from said predetermined value for deflecting said member, means controlled by said member when deflected for operating said motors at different predetermined rates and to different predetermined limits respectively, means controlled by said motors for varying the fuel supply to restore said temperature to the predetermined value and means whereby under predetermined conditions said member is rendered non-operative to control said motors while in a deflected position.

15. In combination, a device to be maintained at a predetermined temperature, a fuel supply therefor, a first motor for controlling the rate of fuel supply to said device, a second motor for controlling the rate of fuel supply to said device, a control mechanism comprising a galvanometer and a deflecting member, means responsive to the variations in temperature of said device from said predetermined value for deflecting said member, means controlled by said member when deflected for operating said motors at different predetermined rates and to different predetermined limits respectively, means controlled by said motors for varying the fuel supply to restore said temperature to the predetermined value, and follow up means controlled by said deflecting member tending to render said control mechanism non-operative.

16. In combination, a tubular oil heater, temperature responsive means measuring the temperature of the oil, first and second motor means for controlling the supply of heat to said oil heater, control means operated in accordance with the rate and the extent of the variations in the measured temperature from a predetermined normal for operating said first motor to vary the supply of heat to said heater between fixed limits and for operating said second motor, said second motor being normally non-operative during the first few operations of said control means and arranged to become operative after an interval of time to further vary said supply of heat to said oil heater.

17. An apparatus for maintaining a predetermined temperature comprising a first fuel controlling means operating to vary the fuel supply in accordance with the rate of change of the temperature to or from a predetermined temperature, and a second fuel controlling means operating to further vary the fuel supply after a predetermined fuel change has been effected by the said first fuel controlling means.

18. A controller having a measuring device responsive to the condition to be controlled, control instrumentalities associated with said measuring device and operating according to the rate of change of the measured quantity so long as the measured quantity is off normal, and means for adjusting the condition to be controlled operated by said instrumentalities, said means acting to make a large adjustment incident to a sudden change in trend of the measured quantity and to make additional adjustments at a slow rate when the measured quantity is departing from normal.

19. A controller for heat exchangers comprising a measuring instrument responsive to the temperature of the material under heat treatment, a control instrument operable by said measuring instrument, said control instrument operating according to the rate of temperature change, according to the extent of temperature departure from normal, and according to the direction of temperature departure from normal, heat supply adjusting means operable by said control instrument for making large initial adjustments in the heat supply to the heat exchanger in response to sudden temperature changes and for making additional adjustment in the heat supply at a slow rate in response to continued temperature deviations.

In testimony whereof, I affix my signature.

RICHARD P. BROWN.